(12) United States Patent
Saur

(10) Patent No.: US 8,907,623 B2
(45) Date of Patent: Dec. 9, 2014

(54) CONSTRUCTION SITE RADIO DEVICE

(71) Applicant: Dietmar Saur, Gomaringen (DE)

(72) Inventor: Dietmar Saur, Gomaringen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/785,962

(22) Filed: Mar. 5, 2013

(65) Prior Publication Data

US 2013/0237173 A1   Sep. 12, 2013

(30) Foreign Application Priority Data

Mar. 6, 2012  (DE) .......................... 10 2012 203 485

(51) Int. Cl.
H02J 7/00   (2006.01)
H02J 7/02   (2006.01)

(52) U.S. Cl.
CPC .............. *H02J 7/025* (2013.01); *H02J 7/0042* (2013.01); *H02J 7/0045* (2013.01); *H02J 7/0044* (2013.01)
USPC ......................................... 320/114; 320/108

(58) Field of Classification Search
USPC .................................................. 320/114, 108
See application file for complete search history.

(56) References Cited

U.S. PATENT DOCUMENTS

| | | | |
|---|---|---|---|
| 7,741,809 B2* | 6/2010 | Zick et al. ...................... 320/114 |
| 2008/0140158 A1* | 6/2008 | Hamel et al. .................... 607/60 |
| 2008/0246850 A1* | 10/2008 | Marlowe ..................... 348/222.1 |
| 2009/0096426 A1* | 4/2009 | Schaper et al. ............... 320/162 |
| 2010/0181964 A1* | 7/2010 | Huggins et al. ............... 320/108 |
| 2011/0009057 A1* | 1/2011 | Saunamaki ................... 455/41.1 |
| 2013/0214890 A1* | 8/2013 | Zabaco .......................... 336/200 |
| 2013/0310018 A1* | 11/2013 | Faenger ......................... 455/420 |
| 2013/0311278 A1* | 11/2013 | Christensen et al. ....... 705/14.49 |

FOREIGN PATENT DOCUMENTS

EP   0 987 783   11/2002

* cited by examiner

*Primary Examiner* — Creighton Smith
(74) *Attorney, Agent, or Firm* — Kenyon & Kenyon LLP

(57) ABSTRACT

A construction site radio device, which has at least one arithmetic unit, a radio device and a charging device which is provided for the purpose of inductively charging a hand tool battery.

28 Claims, 1 Drawing Sheet

CONSTRUCTION SITE RADIO DEVICE

CROSS REFERENCE

The present application claims the benefit under 35 U.S.C. §119 of German Patent Application No. DE 102012203485.4 filed on Mar. 6, 2012, which is expressly incorporated herein by reference in its entirety.

BACKGROUND INFORMATION

A construction site radio device which has a charging device is described in European Patent No. EP 987 783 B1.

SUMMARY

An example construction site radio device is provided which has at least one arithmetic unit, a radio device and a charging device, which is provided for the purpose of inductively charging a hand tool battery. The construction site radio device preferably has at least one radio housing which is protected against environmental influences at least according to protection class IP 53. An "arithmetic unit" is understood to be, in particular, a controller having a processor, a memory unit and/or an operating, control and/or computing program stored in the memory unit. The arithmetic unit is preferably designed as a microcontroller. In particular, a "radio device" is understood to be a device which is provided for the purpose of receiving at least one radio station and outputting the received radio station to a listener at least acoustically. "Provided" is understood to mean, in particular, specially programmed, configured and/or equipped. A "charging device" is understood to be, in particular, a device which is provided for the purpose of transmitting charging energy to a hand tool battery during a charging operation. A "hand tool battery" is understood to be, in particular, a battery which is provided for the purpose of supplying a hand tool with power, in particular during an intended use. The hand tool battery is preferably detachably connected to the hand tool in an operational state, in particular without a tool. Alternatively or additionally, a hand tool battery may be integrated into the hand tool. In particular, a "hand tool" is understood to be a portable tool, including for example, a power drill, a combi drill, a percussion drill, a saw, a plane, a screwdriver, a mortiser, a grinder, an angle grinder, a gardening tool, a construction site measuring device and/or a multifunction tool. The phrase, "inductively charge" is understood to mean, in particular, that the charging device transmits the charging energy to the hand tool battery via an electrical insulator with the aid of a magnetic field. The charging device preferably has a charging coil which transmits the charging energy to a charging coil of the hand tool battery during a charging operation. Due to the design of the construction site radio device according to the present invention, it is possible to transmit the charging energy to the hand tool battery in a manner which is particularly insensitive to environmental influences. In particular, the charging device does not have any sensitive, bare contact surfaces for contacting the hand tool battery.

In another embodiment, it is proposed that the radio device has at least one speaker, the arithmetic unit being provided for the purpose of outputting a signal which is dependent on a charge state of the hand tool battery via the speaker, whereby the operator may be advantageously informed of the charge state with a minimum amount of structural complexity. A "speaker" is understood to be, in particular, a means which is provided for the purpose of converting an electrical signal into an acoustic signal, in particular in an audible frequency range. In particular, a "charge state of the hand tool battery" is understood to be a parameter which is dependent on an amount of energy stored in the hand tool battery. "Dependent on a charge state of the hand tool battery" is understood to mean, in particular, that the signal is assigned to a charge state of the hand tool. The phrase "output a signal" is understood to mean, in particular, that the arithmetic unit generates, with the aid of the speaker, a sound which signals a charge state to the operator in at least one operating state. The arithmetic unit preferably signals at least an end of the charging operation to the operator with the aid of the speaker. The arithmetic unit advantageously outputs, via the speaker, a signal which is dependent on a positioning of the hand tool battery relative to the charging coil of the charging device.

It is furthermore provided that the example construction site radio device has at least one display, the arithmetic unit being provided for the purpose of outputting a piece of information which is dependent on a charge state of the hand tool battery via the display, whereby an advantageous representation of the charge state may be achieved. In particular, a "display" is understood to be a means which is provided for the purpose of visually outputting a piece of information to the operator. The display is preferably designed as an illuminant, particularly advantageously as a display. The phrase "output a piece of information via the display" is understood to mean, in particular, that the display outputs a visual signal to the operator in at least one operating state, the visual signal being assigned to the information which is dependent on the charge state.

It is furthermore proposed that the arithmetic unit is provided for the purpose of outputting at least one piece of radio information via the display, whereby it is possible to display the charge state and the radio information to the operator, in particular on a single display, with a minimum amount of structural complexity. A "piece of radio information" is understood to be a piece of information about a radio reception which appears meaningful to those skilled in the art, however, advantageously a frequency of a radio station, a name of a radio station, a volume and/or a piece of RDS information. In particular, the arithmetic unit is provided for the purpose of outputting the information which is dependent on the charge state of the hand tool battery and the radio information via at least one identical display means.

It is also proposed that the construction site radio device includes an operating element, the arithmetic unit being provided for the purpose of at least controlling a charge state as a function of a parameter of the operating element, whereby charging as needed is advantageously made possible depending on the situation. For example, hand tool batteries may be charged in a settable sequence. In particular, an "operating element" is understood to be a means which is provided for the purpose of accepting an operator input from an operator. For example, the operating element may be designed as a switch, as a button, as a slider, as a knob, as a touch screen and/or as another operating element. A "parameter of the operating element" is understood to be, in particular, a state of the operating element which is dependent on the operator input, in particular an electrically retrievable state thereof. In particular, "at least control" is understood to mean control and/or regulate.

It is furthermore proposed that the arithmetic unit is provided to output at least one radio station as a function of a parameter of the operating element, whereby the charging operation and the radio station may be configured for the operator, in particular with the aid of a single operating element or just a few operating element, with a minimum amount of structural complexity. In particular, the radio device and the charging device are settable by the operator with the aid of the same operating element.

In one advantageous embodiment of the present invention, it is provided that the charging device has a charging plane and at least one charging coil which is provided for the purpose of charging a hand tool battery placed on the charging plane, thereby making it possible to dispense with a fastener. A "charging plane" is understood to be, in particular, a surface of a housing of at least the charging device which is provided with an at least largely flat design in an area of a charging coil. In particular, a "charging coil" is understood to be a coil which receives and/or transmits energy during a charging operation. The charging coil of the charging device preferably transmits energy which charges a hand tool battery during a charging operation. In particular, a charging coil of the hand tool battery receives the energy. The charging coil preferably includes at least one coil winding and, in particular, a coil core. Alternatively or additionally, the charging coil could be designed as an air coil. The charging coil is preferably designed as a printed conductor on a circuit board or particularly preferably as a wound coil. Most preferably, the charging device is provided for the purpose of charging at least one non-fastened hand tool battery.

In another embodiment, it is proposed that the charging plane has at least one coil marking, which makes it possible to comfortably position the hand tool battery for the charging operation. A "coil marking" is understood to be, in particular, a marking which indicates a position of the charging coil of the charging device to an operator. The coil marking preferably indicates to the user where he is to place the hand tool battery for a charging operation.

It is furthermore proposed that the charging device has a fastener and at least one charging coil which is provided for the purpose of charging a hand tool battery fastened by the fastener, whereby a positioning of the hand tool battery is advantageously maintained during a movement and/or during a transport of the construction site radio device. A "fastener" is understood to be, in particular, a means which is provided for the purpose of fastening the hand tool battery in a force-fit manner and/or advantageously in a form-locked manner during a charging operation.

It is furthermore proposed that the radio device and the charging device are designed to be separated by an operator, whereby a particularly flexible use is made possible. In particular, the phrase "designed to be separated by an operator" is understood to mean that the radio device and the charging device have a coupling element which is designed to be detached by an operator and which fastens the radio device and the charging device at least to each other in at least one operating state. The radio device and the charging device are preferably designed to be separated by an operator without tools. Alternatively, the radio device and the charging device may be inseparable by an operator and/or be separable only with a loss of function of the radio device and/or the charging device.

BRIEF DESCRIPTION OF THE DRAWINGS

Further advantages are derived from the description below of the figures. Two exemplary embodiments of the present invention are illustrated in the figures. The figures, and description, include combinations of numerous features. Those skilled in the art will also advantageously view the features individually and combine them in additional meaningful configurations.

DETAILED DESCRIPTION OF EXAMPLE EMBODIMENTS

Figure 1:
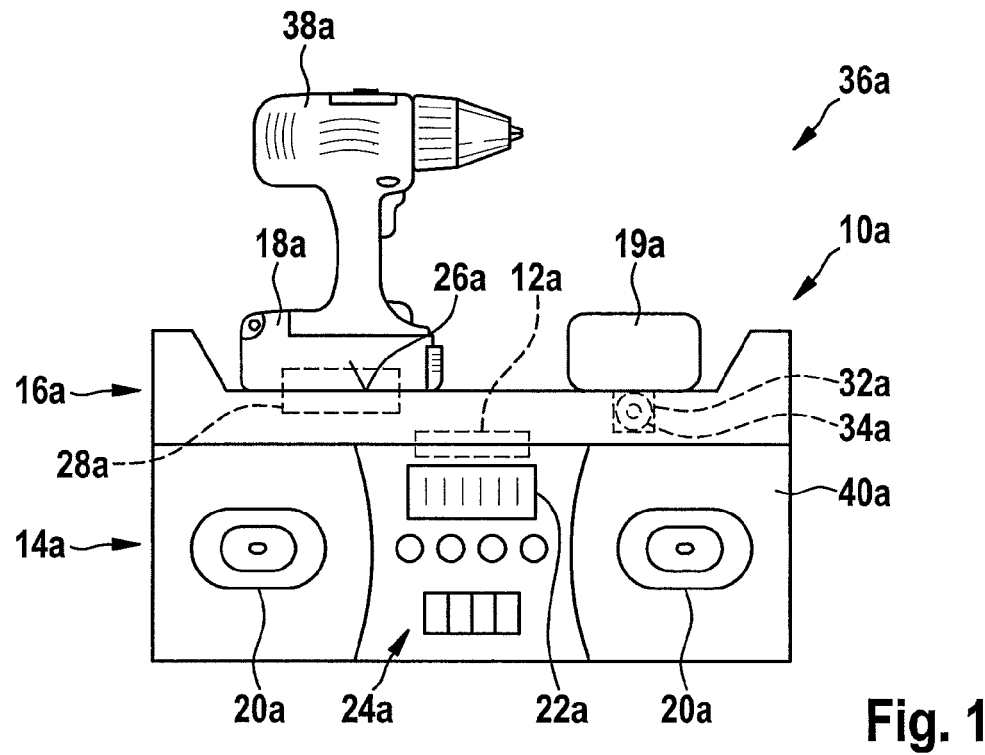
FIG. 1 shows a system which has a construction site radio device according to an example embodiment of the present invention and two hand tool batteries which have a radio device and a charging device which is designed to be inseparable from the radio device, in a front representation.
Figure 2:
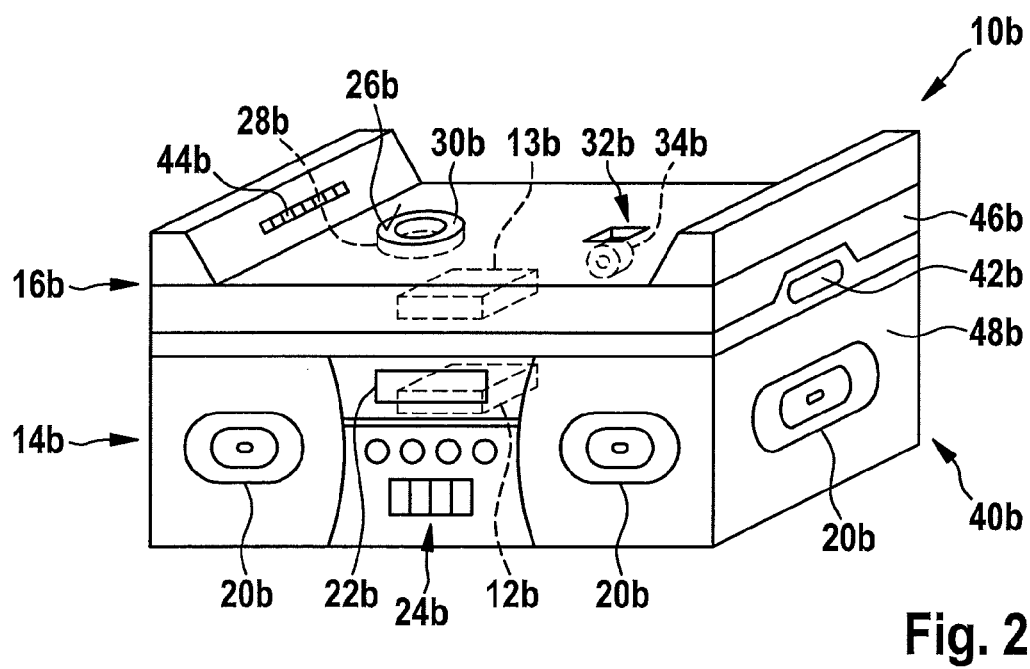
FIG. 2 shows an alternative construction site radio device according to the present invention, which has a radio device and a charging device which is designed to be separable from the radio device, in a perspective representation.

FIG. 1 shows a system 36a which has a construction site radio device 10a and two hand tool batteries 18a, 19a. Construction site radio device 10a includes an arithmetic unit 12a, a radio device 14a and a charging device 16a. Charging device 16a has two charging coils 28a, 34a. Charging coils 28a, 34a each inductively charge one of hand tool batteries 18a, 19a during a charging operation. The first of charging coils 28a is provided for the purpose of charging one of hand tool batteries 18a, which rests unfastened on a charging plane 26a of charging device 16a. Hand tool battery 18a may be connected to a hand tool 38a during the charging operation, as illustrated herein. Charging plane 26a has a coil marking, which is illustrated in FIG. 2 and which an operator may use to align hand tool battery 18a for a charging operation. The coil marking is designed as an annular color marking on charging plane 26a. Arithmetic unit 12a furthermore outputs an acoustic signal to an operator via radio device 14a when hand tool battery 18a is positioned correctly.

Charging device 16a has a fastener 32a which fastens a second of hand tool batteries 19a during a charging operation. Fastener 32a is designed as a recess delimited by charging device 16a, as illustrated in the second exemplary embodiment. Alternatively or additionally, the fastener could be designed as another means for fastening a hand tool battery during a charging operation. Fastener 32a fastens hand tool battery 19a in a form-locked manner. Second hand tool battery 19a has a lock, which is not illustrated in greater detail and which is provided for the purpose of interlocking with charging device 16a during the charging operation. The second of charging coils 34a is thus provided for the purpose of charging a hand tool battery 19a fastened by fastener 32a. Alternatively, a charging device could charge at least two resting or fastened hand tool batteries during a charging operation.

Radio device 14a has two speakers 20a, a display 22a and operating element 24a. Arithmetic unit 12a is provided for the purpose of outputting a signal which is dependent on a charge state of hand tool battery 18a via speaker 20a. Arithmetic unit 12a outputs a sound via speaker 20a whenever one of hand tool batteries 18a, 19a is 80% or 100% charged. Display 22a is designed as a display. Arithmetic unit 12a is provided for the purpose of outputting a piece of information which is dependent on a charge state of hand tool battery 18a via display means 22a. Arithmetic unit 12a outputs an instantaneous charge state of hand tool battery 18a, 19a during the charging operation, for example in percent. Arithmetic unit 12a is furthermore provided for the purpose of outputting a piece of radio information via same display means 22a, for example a name of a set radio station. Arithmetic unit 12a is provided for the purpose of regulating a charging operation and an output of a radio station as a function of a parameter of operating element 24a.

Construction site radio device 10a has a radio housing 40a which connects radio device 14a and charging device 16a to each other in such a way that they are inseparable by an operator.

FIG. 2 shows an additional exemplary embodiment of the present invention. The following descriptions and figures are largely limited to the differences between the exemplary embodiments, it being possible to refer, in principle, to the figures and/or descriptions of the other exemplary embodiment, in particular in FIG. 1, with regard to equivalent components, in particular in reference to components having the same reference numerals. To distinguish between the exemplary embodiments, the letter a is placed after the reference numerals of the exemplary embodiment in FIG. 1. The letter a is replaced by the letter b in the exemplary embodiment in FIG. 2.

FIG. 2 shows an example construction site radio device 10b according to the present invention, which has a radio device 14b and a charging device 16b. Charging device 16b is provided for the purpose of inductively charging a hand tool battery 19b. Radio device 14b and charging device 16b are designed to be separated by an operator. Radio device 14b and charging device 16b are preferably interlocked with each other in at least one operating state. Construction site radio device 10b has an operating element 42b which is provided for the purpose of releasing a connection established by an operator between radio device 14b and charging device 16b. Radio device 14b and charging device 16b each have an arithmetic unit 12b, 13b which communicate with each other in at least one operating state. In this operating state, arithmetic unit 12b of radio device 14b and arithmetic unit 13b of charging device 16b communicate with each other wirelessly. Charging device 16b has a display means 44b, which is provided for the purpose of displaying a charge state independently of radio device 14b. Construction site radio device 10b has a radio housing 40b which connects radio device 14b and charging device 16b to each other in such a way that they are inseparable by an operator. For this purpose, radio housing 40b has a charging housing part 44b and a radio housing part 46b which is designed to be separated from charging housing part 42b.

What is claimed is:

1. A construction site radio device, comprising:
   at least one arithmetic unit;
   a radio device; and
   a charging device to inductively charge a hand tool battery;
   wherein at least one of:
   (A) the radio device further comprises a single operating element panel configured to be user-operated to both control a charging operation of the charging device and set a function of the radio device;
   (B) the radio device and the charging device are designed to be separated by an operator;
   (C) the inductive charge of the hand tool battery which the charging device is configured to perform is through an electrical insulator using a magnetic field;
   (D) (i) the radio device further includes a releasing element, (ii) the charging device includes an induction coil for the charging of the hand tool battery and is detachably connectable to the radio device, (iii) the releasing element is user operable for releasing the charging device from the radio device, (iv) the charging device is configured to charge the hand tool battery while the charging device is in contact with the hand tool battery, and (v) the radio device is configured to output, via a speaker of the radio device, audio based on a received radio signal; and
   (E) (i) the charging device includes a charging coil which is configured to charge a hand tool battery, and
   (ii) at least one of the following:
   (1) the charging device includes a charging plane which is at least one of (a) an exterior surface and (b) a top surface of the radio device, and the charging coil is configured to charge the hand tool battery when the hand tool battery is placed on the charging plane; and
   (2) the device includes a fastener, and the charging coil is configured to charge the hand tool battery when the hand tool battery is fastened with the aid of the fastener.

2. The construction site radio device as recited in claim 1, wherein the arithmetic unit is configured to output an audio signal which is dependent on a charge state of the hand tool battery.

3. The construction site radio device as recited in claim 1, further comprising:
   at least one display, wherein the arithmetic unit is configured to output a piece of information which is dependent on a charge state of the hand tool battery via the display.

4. The construction site radio device as recited in claim 3, wherein the arithmetic unit is configured to output at least one piece of radio information via the display.

5. The construction site radio device as recited in claim 1, wherein the radio device includes the single operating element panel configured to be user-operated to both control the charging operation of the charging device and set the function of the radio device.

6. The construction site radio device as recited in claim 5, wherein the arithmetic unit is configured to output audio of at least one radio station according to the function set using the operating element panel.

7. The construction site radio device as recited in claim 1, wherein the charging device includes the charging plane and the charging coil which is configured to charge the hand tool battery placed on the charging plane, and wherein the charging plane is the exterior surface of the construction site radio device.

8. The construction site radio device as recited in claim 7, wherein the charging plane has at least one coil marking.

9. The construction site radio device as recited in claim 1, wherein the charging device includes the fastener and charging coil configured to charge hand tool battery when fastened with the aid of the fastener.

10. The construction site radio device as recited in claim 1, wherein the radio device and the charging device are designed for the operator separation.

11. A system, comprising:
    a hand tool battery; and
    a construction site radio device, including at least one arithmetic unit, a radio device, and a charging device to inductively charge the hand tool battery;
    wherein at least one of:
    (A) the hand tool battery includes an inductive coil, and the charging device includes an inductive coil configured to cooperate with the inductive coil of the hand tool battery for the charging of the hand tool battery; and
    (B) (i) the system further comprises a hand tool, (ii) the hand tool battery is configured for connection to the hand tool to provide power to the hand tool, and (iii) the charging device is configured to perform the inductive charging of the hand tool battery while the hand tool battery is connected to the hand tool according to the connection by which the hand tool battery is configured to provide power to the hand tool.

12. The system as recited in claim 11, wherein:
the system further includes the hand tool:
the hand tool battery is configured for connection to the hand tool to provide power to the hand tool; and
the charging device is configured to perform the inductive charging of the hand tool battery while the hand tool battery is connected to the hand tool according to the connection by which the hand tool battery is configured to provide power to the hand tool.

13. The system as recited in claim 11, wherein the hand tool battery includes an inductive coil, and the charging device includes an inductive coil configured to cooperate with the inductive coil of the hand tool battery for the charging of the hand tool battery.

14. A construction site radio device, comprising:
at least one arithmetic unit;
a radio device; and
a charging device to inductively charge a hand tool battery; wherein:
the radio device includes a speaker for output of audio based on a received radio signal;
the charging device is configured to perform the inductive charging of the hand tool battery while the hand tool battery is both unattached and external to the construction site radio device; and
the at least one arithmetic unit is configured to control the speaker to output an audio signal indicating that the hand tool battery has been placed in close enough proximity to a charging coil of the charging device for the inductive charging to occur.

15. The construction site radio device as recited in claim 1, wherein the inductive charge of the hand tool battery which the charging device is configured to perform is through the electrical insulator using the magnetic field.

16. The construction site radio device as recited in claim 1, wherein the charging device is configured to charge the hand tool battery while the hand tool battery is not attached to the charging device.

17. The construction site radio device as recited in claim 1, wherein:
the radio device further comprises the releasing element;
the charging device includes the induction coil for the charging of the hand tool battery and is detachably connectable to the radio device;
the releasing element is user operable for releasing the charging device from the radio device;
the charging device is configured to charge the hand tool battery while the charging device is in contact with the hand tool battery; and
the radio device is configured to output, via the speaker of the radio device, the audio based on the received radio signal.

18. The construction site radio device as recited in claim 1, wherein the charging device includes the charging plane and the charging coil which is configured to charge the hand tool battery placed on the charging plane, and wherein the charging plane is the top surface of the construction site radio device.

19. The construction site radio device as recited in claim 18, wherein the charging plane is a substantially flat plane.

20. The construction site radio device as recited in claim 18, wherein the charging plane includes a plurality of charging coils configured to charge a plurality of hand tool batteries at substantially the same time.

21. The construction site radio device as recited in claim 18, wherein the charging plane is configured to charge the hand tool battery while the hand tool battery rests unfastened on the charging plane.

22. The construction site radio device as recited in claim 18, wherein the charging plane includes at least one connecting element configured for releasably connecting the hand tool battery to the charging plane.

23. The construction site radio device as recited in claim 18, wherein the charging coil comprises at least one coil winding and at least one coil core.

24. The construction site radio device as recited in claim 18, wherein the charging device and the radio device include connecting elements configured for releasably connecting the charging device to the radio device.

25. The construction site radio device as recited in claim 24, wherein the radio device further includes a user operable releasing element configured for releasing the connection between the charging device and the radio device.

26. The construction site radio device as recited in claim 24, wherein the charging device substantially covers the entire top surface of the radio device.

27. The construction site radio device as recited in claim 1, wherein the charging device includes the charging coil.

28. The construction site radio device as recited in claim 7, wherein the charging device is configured to charge the hand tool battery while the hand tool battery is not attached to the charging device.

* * * * *